United States Patent
Schantz

(10) Patent No.: US 7,257,216 B2
(45) Date of Patent: Aug. 14, 2007

(54) SELECTIVE MESSAGE DISCARD

(75) Inventor: John L. Schantz, Plano, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 716 days.

(21) Appl. No.: 10/700,216

(22) Filed: Nov. 3, 2003

(65) Prior Publication Data

US 2005/0094797 A1 May 5, 2005

(51) Int. Cl.
*H04M 7/00* (2006.01)

(52) U.S. Cl. ........................ 379/229; 379/230
(58) Field of Classification Search ............... 379/229, 379/230, 221.08–221.1; 370/401, 410, 467
See application file for complete search history.

(56) References Cited

U.S. PATENT DOCUMENTS 6,674,748 B1 * 1/2004 Dykhuizen et al. ......... 370/352
6,747,980 B1 * 6/2004 Dykhuizen et al. ......... 370/401

FOREIGN PATENT DOCUMENTS

WO   WO 01/19010 A1   3/2001
WO   WO 02/15510 A3   2/2002

OTHER PUBLICATIONS

Great Britain Search Report Issued Feb. 24, 2005.

* cited by examiner

*Primary Examiner*—Benny Q. Tieu

(57) ABSTRACT

An article of manufacture comprising a program storage medium having computer readable code embodied therein is disclosed. The computer readable code is configured to enable selective discarding of messages received at a receiving device coupled to a telecommunication network. There is included code for ascertaining whether a type associated with a received message at the receiving device is one of protected message types. There is further included code for passing, if the type associated with the received message is the one of the protected message types, the received message to an application irrespective of an age of the received message, the age being representative of a time duration that the message has been present in the receiving device.

20 Claims, 2 Drawing Sheets

SS7 TCAP Protocol Message (ANSI and ITU)

| SS7 MTP Routing Label | | | SS7 SCCP Headers | TCAP Message | | |
|---|---|---|---|---|---|---|
| DPC | OPC | SLS | | TCAP Message Type | Length | TCAP Parameters |

SS7 ISUP Protocol Message (ANSI)

| SS7 MTP Routing Label | | | | ISUP Message | |
|---|---|---|---|---|---|
| DPC | OPC | SLS | CIC | Heading Code H0 / Heading Code H1 | ISUP Parameters |

ISUP Message Type

SS7 ISUP Protocol Message (ITU)

| SS7 MTP Routing Label | | | | ISUP Message | |
|---|---|---|---|---|---|
| DPC | OPC | SLS | CIC | TCAP Message Type | ISUP Parameters |

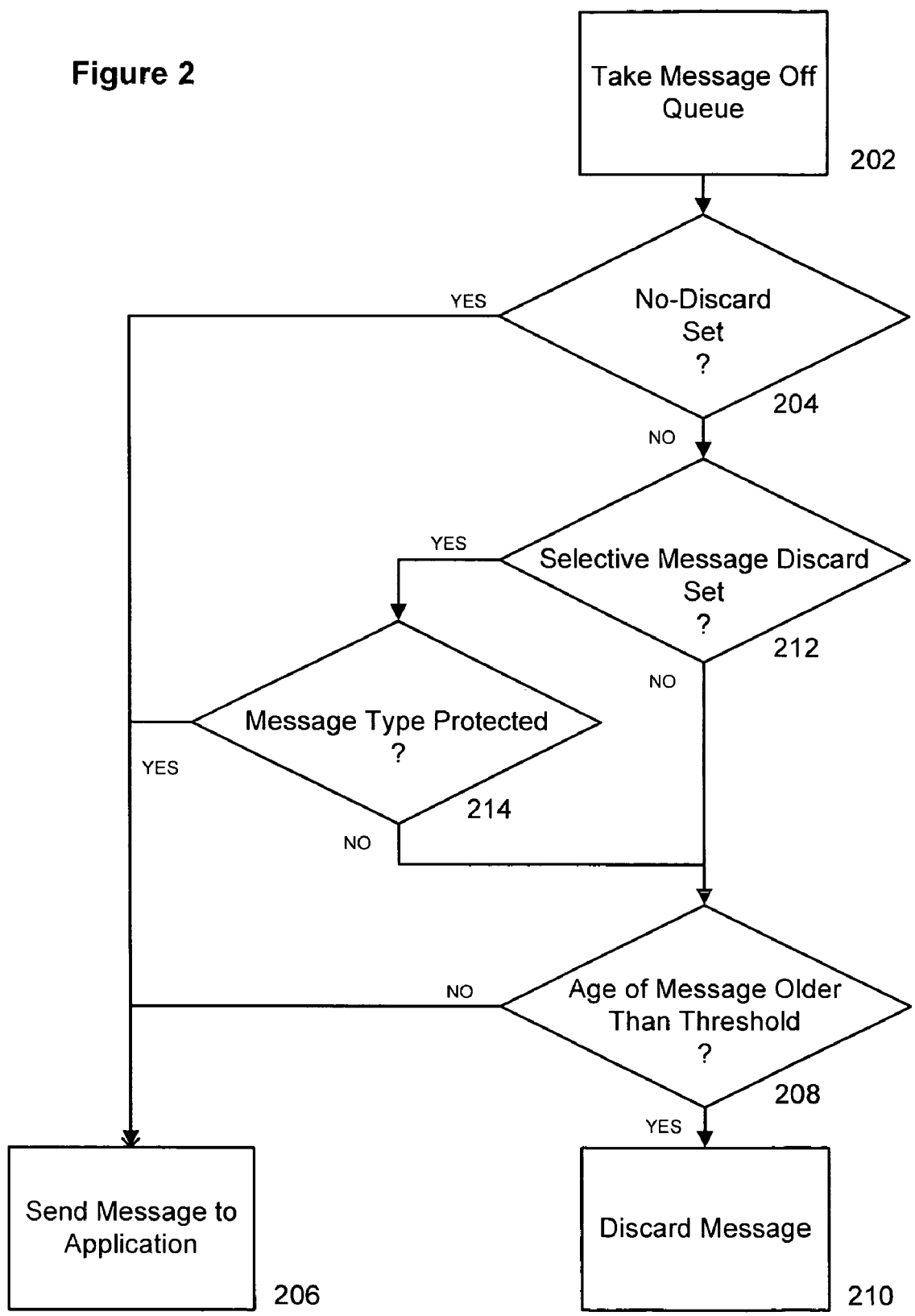

SELECTIVE MESSAGE DISCARD

BACKGROUND OF THE INVENTION

Graphical User Interfaces (GUIs) have long been employed to facilitate user data input and/or display output data. By way of example, tables have long been employed to display data in the form of rows and columns, as well as to allow the user to input data into the rows and columns of the table. Charts, graphs, pop-up dialogs, and the like are other examples of GUIs that have been employed.

The SS7 protocol has long been employed as a signaling mechanism in telecommunication systems. Although there are many different versions of the SS7 protocol, it has been observed that the message discard mechanism in the SS7 protocol is rather inflexible. Generally speaking, when SS7 messages are received, they are first stored in an input queue. Messages are taken from the input queue and sent to the application for processing.

Each message, however, takes a finite amount of time to process and as the number of messages received overwhelms the processing capability of the system, fewer messages are removed from the input queue than are sent to the input queue. As the input queue fills up, a congestion condition is encountered.

To relieve congestion, messages are discarded based on their age. Generally speaking, the system examines the receive time-stamp associated with each SS7 message and calculates the age of the message to determine whether the message is older than a specified threshold. If the threshold is exceeded, the message is discarded.

While time-based message discard is necessary to relieve system congestion, certain modern telecommunication services, however, make it highly disadvantageous or even impractical to indiscriminately discard messages. On the other hand, if messages are not discarded from the input queue at all, congestion worsens over time and the system ultimately fails.

SUMMARY OF INVENTION

The invention relates, in one embodiment, to a method for selectively discarding SS7 messages received at a receiving device, the receiving device being part of a telecommunication network. The method includes ascertaining whether a selective message discard feature is enabled in the receiving device. The method further includes ascertaining, if the selective message discard is enabled, whether a message type associated with a received message at the receiving device is one of the protected message types. The method also includes passing, if the message type associated with the received message is the one of the protected message types, the received message to an application irrespective of an age of the received message; the age being representative of a time duration that the message has been present in the receiving device.

In another embodiment, the invention relates to a receiving device coupled to a telecommunication network, the receiving device being configured to receive SS7 messages from a transmitting device also coupled to the telecommunication network. The receiving device includes logic for ascertaining whether a selective message discard feature is enabled in the receiving device. There is included logic for ascertaining, if the selective message discard is enabled, whether a message type associated with a received message at the receiving device is one of protected message types. There is further included logic for passing, if the message type associated with the received message is the one of the protected message types, the received message to an application irrespective of an age of the received message; the age being representative of a time duration that the message has been present in the receiving device.

In yet another embodiment, the invention relates to an article of manufacture comprising a program storage medium having computer readable code embodied therein. The computer readable code is configured to enable selective discarding of messages received at a receiving device coupled to a telecommunication network. There is included code for ascertaining whether a message type associated with a received message at the receiving device is one of protected message types. There is further included code for passing, if the message type associated with the received message is the one of the protected message types, the received message to an application irrespective of an age of the received message; the age being representative of a time duration that the message has been present in the receiving device.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A shows, in accordance with one embodiment of the present invention, the bit field employed by the invention to determine whether a SS7 TCAP protocol message should be protected.

FIG. 1B shows, in accordance with one embodiment of the present invention, the bit field employed by the invention to determine whether a SS7 ISUP (American National Standards Institute or ANSI) message should be protected.

FIG. 1C shows, in accordance with one embodiment of the present invention, the bit field employed by the invention to determine whether a SS7 ISUP (International Telecommunications Union or ITU) message should be protected.

FIG. 2 shows, in accordance with one embodiment of the present invention, the pseudo-logic for deciding whether a message in the input queue should be protected or discarded.

DETAILED DESCRIPTION OF PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one embodiment of the present invention, there is provided a selective message discard technique that is capable of protecting specified message types irrespective of their age while still enabling time-based discard to take place to relieve system congestion. In one embodiment, message types that are deemed critical, i.e., need protection, are protected for the receiving application (a network service) so that these messages are never discarded irrespective of their age. Message types that are not deemed critical, i.e., protected, are still discarded during times when system congestion occurs.

In one embodiment, one byte of the SS7 message may be employed for identifying the message type. The SS7 protocol supports multiple application-facing protocols (e.g., ISDN User Part (ISUP) and Transaction Capabilities Application Part (TCAP)). Each of these application-facing protocols use a one-byte field to identify its message types. The protection may be detected at the receiving system (also known as receiving device) using, for example, a bit masking technique. Not all message type should be protected. Generally speaking, the number of protected message types is preferably kept low in order to encourage message discard, thereby allowing the system to recover from congestion situations.

FIG. 1A shows, in accordance with one embodiment of the present invention, the bit field 102 employed by the invention to determine whether a SS7 TCAP protocol message should be discarded. FIG. 1B shows, in accordance with one embodiment of the present invention, the bit field 104 employed by the invention to determine whether a SS7 ISUP (American National Standards Institute or ANSI) message should be discarded. FIG. 1C shows, in accordance with one embodiment of the present invention, the bit field 106 employed by the invention to determine whether a SS7 ISUP (International Telecommunications Union or ITU) message should be discarded.

FIG. 2 shows, in accordance with one embodiment of the present invention, the pseudo-logic for deciding whether a message in the input queue should be discarded. In step 202, a message from the input queue and examined. Generally speaking, the message to be examined is taken from the top of the queue during de-queuing (202).

In step 204, if the no-discard option is selected in the receiving system, the message is forwarded to the application without further examination (step 206). In this case, the system and/or the application has requested that no message discard take place irrespective of the message types. This no-discard state may be provided for when it is deemed that all messages are application critical, for example.

On the other hand, if the no-discard option is not enabled (i.e., message discard is allowed), all message types are not deemed critical, and any message may be discarded unless their message types are deemed protected. If the selective message discard option is set in the receiving system (212), the incoming message is checked to see if its message type is one of the protected message types. If the message type of the incoming message is one of the protected message types, the incoming message is sent to the application. Note that when the message type is protected, no examination of its age is necessary.

On the other hand, if the message type of the incoming message is not one of the protected message types or if the selective message discard option is not set in the receiving system, the message may be discarded if its age exceeds a certain threshold. Thus, the age of the message is checked in step 208. The age of a message may be calculated as the difference between the current system time and the timestamp associated with the message upon being received at the input queue, for example. If the age of the message is less than the predefined threshold, the message is transmitted to the application (206). On the other hand, if the age of the message is older than the predefined threshold, it is discarded (210). In one embodiment, if the age of the message is older than or equal to the predefined threshold, it is discarded.

Note that the invention is fully backward compatible with legacy applications that either does not have the ability to provide for a "no-discard" option to protect all incoming messages or does not have the ability to protect certain messages based on their message types. For these legacy applications, incoming messages will be treated as before, i.e., an incoming message will be discarded if its age exceeds a predefined threshold Note that the invention includes, in addition to the technique for selective discard, the receiving system/device, which can selectively discard SS7 message types based on the "no-discard" status and/or the "protection" status of the message. The receiving system/device may implement the selective discard features discussed herein using hardware and/or software (including firmware). Given the disclosure herein, one skilled in the art would be able to employ various combinations of commonly available electronic components (e.g., processor, memory, programmable logic, discrete logic, and the like) and known software programming languages and tools to achieve the unique features discussed.

As known by those skilled in the art, when features are implemented by programmable circuitry, the same physical electronic component may perform different tasks at different times depending on the software being executed and/or data being operated upon, i.e., that same physical electronic component may behave as different logic circuits at different times. Accordingly, the selective discard features should be understood as being implemented by software and/or hardware logic, which may be different hardware circuits or one or more physical hardware circuits executing code that cause that same physical hardware circuit or circuits to perform different tasks at different times. Additionally, the invention also includes software code stored in a computer-readable medium (such as magnetic or optical medium) for performing the inventive features disclosed herein.

As can be appreciated from the foregoing, the invention can accommodate message types that are critical and thus never to be discarded irrespective of their age. Little overhead is required for this option because once the "no discard" option is set, all incoming messages are simply sent to the application.

Furthermore, a message can be protected and thus will not get discarded even if its age exceeds the pre-defined threshold. This option also involves little overhead since the discard decision is based on message types, which can be ascertained fairly rapidly.

The calculation of the age of an incoming message is undertaken only if the no-discard option is not set and if the type of the incoming message is not one of the protected types. For some systems, this may be only a fraction of the number of incoming messages. Accordingly, the overhead involved in message age calculation is not incurred by every incoming message.

If a message type is not protected and its age exceeds the pre-defined threshold, message discard can then take place. This flexibility enables the system to avoid congestion while enabling selective message discard. Additionally, as mentioned, the technique is fully backward compatible with legacy applications. As discussed, these legacy applications may simply apply the default age-based message discard methodology to messages taken off the input queue.

While this invention has been described in terms of several preferred embodiments, there are alterations, permutations, and equivalents which fall within the scope of this invention. For example, the selective message discard technique disclosed herein may also apply to protocols such as SIP (Session Initiation Protocol). It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for selective discarding SS7 messages received at a receiving device, said receiving device being part of a telecommunication network, comprising:

ascertaining whether a selective message discard feature is enabled in said receiving device;

if said selective message discard is enabled, ascertaining whether a type associated with a received message at said receiving device is one of protected message types; and if said type associated with said received message is said one of said protected message types, passing said received message to an application irrespective of an age of said received message, said age being representative of a time duration that said message has been present in said receiving device.

2. The method of claim 1 further comprising determining, if said type associated with said receive message is not said one of said protected message types, said age of said received message; and discarding said received message if said age of said received message exceeds a predetermined threshold.

3. The method of claim 2 wherein said received message is taken from an input queue, said received message is passed onto said application if said age of said received message is determined to be less than said predetermined threshold.

4. The method of claim 3 further comprising ascertaining, prior to said ascertaining whether said selective message discard feature is enabled, whether a no-discard feature is enabled in said receiving device; and if said no-discard feature is enabled in said receiving device, passing all said messages received at said receiving device to their respective applications without discarding.

5. The method of claim 4 wherein said received message represents a SS7 Transaction Capabilities Application Part (TCAP) message.

6. The method of claim 4 wherein said received message represents a SS7 NSI (American National Standards Institute) message.

7. The method of claim 4 wherein said received message represents a SS7 ITU (International Telecommunications Union) message.

8. A receiving device coupled to a telecommunication network, said receiving device being configured to receive SS7 messages from a transmitting device also coupled to said telecommunication network, comprising:

logic for ascertaining whether a selective message discard feature is enabled in said receiving device;

logic for ascertaining, if said selective message discard is enabled, whether a type associated with a received message at said receiving device is one of protected message types; and logic for passing, if said type associated with said received message is said one of said protected message types, said received message to an application irrespective of an age of said received message, said age being representative of a time duration that said message has been present in said receiving device.

9. The receiving device of claim 8 further comprising logic for determining, if said type associated with said receive message is not said one of said protected message types, said age of said received message; and logic for discarding said received message if said age of said received message exceeds a predetermined threshold.

10. The receiving device of claim 9 wherein said received message is taken from an input queue, said received message is passed onto said application if said age of said received message is determined to be less than said predetermined threshold.

11. The receiving device of claim 10 further comprising logic for ascertaining, prior to said ascertaining whether said selective message discard feature is enabled, whether a no-discard feature is enabled in said receiving device; and logic for passing, if said no-discard feature is enabled in said receiving device, all said messages received at said receiving device to their respective applications without discarding.

12. The receiving device of claim 11 wherein said received message represents a SS7 Transaction Capabilities Application Part (TCAP) message.

13. The receiving device of claim 11 wherein said received message represents a SS7 ANSI (American National Standards Institute) message.

14. The receiving device of claim 11 wherein said received message represents a SS7 ITU (International Telecommunications Union) message.

15. An article of manufacture comprising a program storage medium having computer readable code embodied therein, said computer readable code being configured to enable selective discarding of messages received at a receiving device coupled to a telecommunication network, comprising:

code for ascertaining whether a type associated with a received message at said receiving device is one of protected message types; and code for passing, if said type associated with said received message is said one of said protected message types, said received message to an application irrespective of an age of said received message, said age being representative of a time duration that said message has been present in said receiving device, wherein said computer readable code embodied in said article of manufacture is configured to be executed in at least one computer system to relieve message congestion at said receiving device.

16. The article of manufacture of claim 15 further comprising code for determining, if said type associated with said receive message is not said one of said protected message types, said age of said received message; and code for discarding said received message if said age of said received message exceeds a predetermined threshold.

17. The article of manufacture of claim 16 wherein said received message is taken from an input queue, said received message is passed onto said application if said age of said received message is determined to be less than said predetermined threshold.

18. The article of manufacture of claim 17 further comprising code for ascertaining, prior to said ascertaining whether said type associated with said received message at said receiving device is said one of said protected message types, whether a no-discard feature is enabled in said receiving device; and code for passing, if said no-discard feature is enabled in said receiving device, all said messages received at said receiving device to their respective applications without discarding.

19. The article of manufacture of claim 18 wherein said received message represents a SS7 Transaction Capabilities Application Part (TCAP) message.

20. The article of manufacture of claim 18 wherein said received message represents one of a SS7 ANST (American National Standards Institute) message and a SS7 ITU (International Telecommunications Union) message.

* * * * *

UNITED STATES PATENT AND TRADEMARK OFFICE
CERTIFICATE OF CORRECTION

| | | |
|---|---|---|
| PATENT NO. | : 7,257,216 B2 | Page 1 of 1 |
| APPLICATION NO. | : 10/700216 | |
| DATED | : August 14, 2007 | |
| INVENTOR(S) | : John L. Schantz | |

It is certified that error appears in the above-identified patent and that said Letters Patent is hereby corrected as shown below:

In column 8, line 5, in Claim 20, delete "ANST" and insert -- ANSI --, therefor.

Signed and Sealed this

Twelfth Day of January, 2010

David J. Kappos
*Director of the United States Patent and Trademark Office*